United States Patent [19]

Biale

[11] Patent Number: 5,202,375
[45] Date of Patent: Apr. 13, 1993

[54] WATER-RESISTANT POLYMERIC EMULSIONS

[75] Inventor: John Biale, Anaheim, Calif.

[73] Assignee: Rohm and Haas Company, Phildelphia, Pa.

[21] Appl. No.: 700,332

[22] Filed: May 6, 1991

Related U.S. Application Data

[63] Continuation of Ser. No. 386,886, Jul. 28, 1989, abandoned.

[51] Int. Cl.$^5$ ............................................. C08K 33/06
[52] U.S. Cl. .................... 524/562; 524/577; 524/578; 524/845
[58] Field of Search ........................ 524/562, 577, 845

[56] References Cited

U.S. PATENT DOCUMENTS

| | | | |
|---|---|---|---|
| 3,896,070 | 7/1975 | Tümmler et al. | 524/512 |
| 3,896,072 | 7/1975 | Tümmler et al. | 260/29.6 |
| 4,153,592 | 5/1979 | Burroway et al. | 260/29.6 |
| 4,193,902 | 3/1980 | Mondt et al. | 526/80 |
| 4,617,230 | 10/1986 | Shah et al. | 524/831 |
| 4,713,412 | 12/1987 | Czerepinski et al. | 524/833 |

FOREIGN PATENT DOCUMENTS

| | | |
|---|---|---|
| 0044399 | 1/1981 | European Pat. Off. . |
| 0071071 | 7/1982 | European Pat. Off. . |
| 0219868 | 10/1986 | European Pat. Off. . |
| 2556327 | 6/1967 | Fed. Rep. of Germany . |
| 2431576 | 11/1979 | Fed. Rep. of Germany . |
| 2545108 | 7/1986 | Fed. Rep. of Germany . |
| 59-161417 | 9/1984 | Japan . |
| 1072042 | 6/1967 | United Kingdom . |

OTHER PUBLICATIONS

Biale, U.S. Ser. No. 07/363,492 filed Jun. 8, 1989; High--Gloss Latex Paints and Polymeric Compositions For Use Therein.
Chemical Abstracts: 102:97055g (1985).

Primary Examiner—John C. Bleutge
Assistant Examiner—Mark Sweet
Attorney, Agent, or Firm—James G. Vouros

[57] ABSTRACT

A polymeric emulsion comprising a (i) polymer, (ii) water, and (iii) a surfactant is useful for producing a water-resistant film. The polymer comprises about 25 to about 90 weight percent of a soft monomer whose homopolymer has a $T_g$ of less than about $-20°$ C., about 10 to about 75 weight percent of a hard monomer whose homopolymer has a $T_g$ of greater than about 30° C., about 1 to about 5 weight percent of an olefinic carboxylic acid, and about 0.5 to about 5 weight percent of a cross-linking agent. Typically, the polymer comprises less than about 1 weight percent surfactant and has a $T_g$ of about $-50°$ to about 50° C. and an average particle size of less than about 250 nm. The emulsion generally comprises at least about 40 weight percent solids and has a surface tension of at least about 45 dynes/cm.

20 Claims, No Drawings

WATER-RESISTANT POLYMERIC EMULSIONS

This application is a continuation of application Ser. No. 07/386,886 filed Jul. 28, 1989 now abandoned.

BACKGROUND

The present invention relates to water-resistant polymeric emulsions and processes for manufacturing polymeric emulsions.

Oil-base products exist for rendering the surface of a substrate water-resistant. However, the long term availability of these products is doubtful because of increasing environmental restrictions on oil-based products.

SUMMARY OF THE INVENTION

The present invention provides water-based polymeric emulsions that are used to render the surface of a substrate water-resistant. The polymeric emulsions contain at least about 40 percent solids and comprise a (i) a polymer, (ii) water, and (iii) a surfactant. Usually, the emulsion comprises less than about 1 weight percent surfactant based on the total monomer weight in the polymer. The polymer comprises about 25 to about 90 weight percent soft monomer, about 10 to about 75 weight percent hard monomer, about 1 to about 5 weight percent olefinic carboxylic acid monomer, and about 0.5 to about 5 weight percent cross-linking monomer. As used in the specification and claims, the term "soft monomer" means a monomer whose homopolymer has a $T_g$ of less than about $-20°$ C.; the term "hard monomer" means a monomer whose homopolymer has a $T_g$ of greater than about $30°$ C.; and the terms "weight percent hard monomer," "weight percent soft monomer," "weight percent olefinic carboxylic acid monomer," and "weight percent cross-linking monomer" each mean the total dry weight of the respective constituent ingredient employed in making the polymer divided by the total weight of the monomers employed in making the polymer, this quotient being multiplied by 100%. Generally, the emulsions have a surface tension of at least about 45 dynes/cm and the polymers have an average particle size of less than 250 nm. When the emulsion is applied to a surface and dried, it forms a water-resistant film.

The invention also encompasses a process for making the emulsion. The process comprises the steps of (a) delay adding the soft monomer, the hard monomer, the olefinic carboxylic acid, the cross-linking agent, and additional catalyst to a charged reactor to form an emulsion; and (b) proximate the end of the delay addition step, adjusting the pH of the emulsion to substantially neutralize all carboxylic acid groups on the polymer to stabilize the emulsion. The language "delay adding" is a term of art that means adding ingredients during at least a portion of the polymerization period.

DETAILED DESCRIPTION OF THE INVENTION

In accordance with the present invention, each polymeric emulsion comprises a (i) polymer, (ii) water, and (iii) a surfactant. Generally, the emulsion comprises less than about 1 weight percent surfactant. As used in the specification and the claims, "weight percent surfactant" is defined as the total dry weight of the surfactant(s) employed in making the polymer divided by the total weight of the monomers employed in making the polymer, this quotient being multiplied by 100%. Preferably the emulsion comprises less than about 0.5 weight percent surfactant.

In general, when all other parameters are held constant, the lower the surfactant content of the polymer, the more insensitive the polymer is to water and the higher the surface tension of the emulsion. Typically, the emulsion has a surface tension of at least about 45 dynes/cm, and preferably about 45 to about 65 dynes/cm.

The surfactant is normally a copolymerizable surfactant, an anionic surfactant, a nonionic surfactant, or a mixture of two or more of these surfactants. Exemplary copolymerizable surfactants include, but are not limited to, sulfoethylmethacrylate, vinylsulfonate salts, sulfopropylmethacrylate, styrene sulfonate salts, 2-acrylamido-2-methylpropanesulfonic acid salts, and mixtures thereof. Anionic surfactants include, but are not limited to, alkylphenolethoxylate sulfates and sulfonates, alkylsulfates and sulfonates, and mixtures thereof. Nonionic surfactants include, but are not limited to, alkylarylpolyether alcohols, alkylphenolethoxylates, alkylethoxylates, ethyleneoxide/propylene oxide block copolymers, and mixtures thereof.

The polymer generally comprises about 25 to about 90 weight percent of a soft monomer, about 10 to about 75 weight percent of a hard monomer, about 1 to about 5 weight percent of an olefinic carboxylic acid, and about 0.5 to about 5 weight percent of a cross-linking agent, and typically has a $T_g$ of about $-50°$ to about $50°$ C. Preferably, the polymer comprises about 2 to about 4 weight percent olefinic carboxylic acid and about 1 to about 3 weight percent cross-linking agent.

Olefinic carboxylic acid monomers include both mono-olefinic carboxylic acid monomers and di-olefinic carboxylic acid monomers. Exemplary mono-olefinic carboxylic acids include, but are not limited to, acrylic acid and methacrylic acid. An exemplary di-olefinic carboxylic acid is itaconic acid. The preferred olefinic carboxylic acid monomer is methacrylic acid. However, mixtures of olefinic carboxylic acids can also be used.

Typical cross-linking agents include, but are not limited to, N-methylol acrylamide, N-methylol methacrylamide, diacrylates, dimethacrylates, triallyl cyanurate, diallyl maleate, methyl acrylamidoglycolate methyl ether, olefinically unsaturated monomers having the formula I

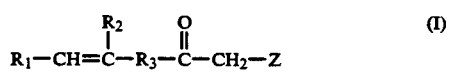

and mixtures thereof, wherein $R_1$ is selected from the group consisting of hydrogen and halogen, $R_2$ is selected from the group consisting of hydrogen, halo, thio, and monovalent organic radicals, $R_3$ is a divalent radical, and Z is selected from the group consisting of organoacyl and cyano. Preferably, $R_1$ is hydrogen, $R_2$ is hydrogen or an alkyl radical having up to about 10 carbon atoms, $R_3$ is a cyclic or acyclic organic radical containing up to about 40 carbon atoms, and Z is an organoacyl having the formula II

wherein R$_4$ is selected from the group consisting of hydrogen and monovalent organic radicals. More preferably, R$_3$ is an acyclic radical containing up to about 20 atoms in length, with any and all side groups each being up to about 6 atoms in length, and R$_4$ is hydrogen or an alkyl group containing up to about 7 carbon atoms. R$_3$ is most preferably an alkylene group containing up to about 10 carbon atoms, and R$_4$ is most preferably methyl. Due to its commercial availability, the preferred cross-linking agent of formula I is acetoacetoxyethyl methacrylate. However, the most preferred cross-linking agent is N-methylol acrylamide.

In one version of the present invention, the emulsion is employed as a water-resistant edge sealer for composite (or particle) boards or plywood. In this version, the weight ratio of the hard monomer to the soft monomer in the polymer is preferably about 1:1 to about 1.5:1, and the polymer preferably has a T$_g$ of about 0° to about 20° C. Typically, in this embodiment of the invention, the emulsion is applied to a substrate and dried at ambient temperature.

However, in a second embodiment of the invention, the emulsion is applied to a substrate, e.g., ceramic or cement tiles, and dried at an elevated temperature, e.g., above about 50° C. In this second version, the weight ratio of the hard monomer to the soft monomer in the polymer is preferably about 1.5:1 to about 3:1, and the polymer preferably has a T$_g$ of about 30° to about 50° C.

In another version, the emulsion is employed as a water-resistant pressure sensitive adhesive (PSA). In this latter version, the weight ratio of the hard monomer to the soft monomer in the polymer is preferably about 1:4 to about 1:9, and the polymer preferably has a T$_g$ of about −35° to about −50° C.

In all versions of the invention, the soft and hard monomers together typically constitute at least about 90 weight percent of the polymer, and preferably at least about 95 weight percent of the polymer.

The soft monomer is typically selected from the group consisting of non-functional acrylic monomers, ethylene, and mixtures thereof. As used in the specification and claims, the term "non-functional monomer" means a monomer that is devoid of any group, e.g., hydroxyl, carboxyl, amide, and amine, that can undergo further reaction after polymerization of the monomer; and the term "soft monomer" means a monomer whose homopolymer has a T$_g$ of less than about −20° C. Non-functional acrylic monomers are the preferred soft monomers.

The non-functional acrylic monomers have the formula III

wherein R$_5$ is selected from the group consisting of hydrogen and methyl, and R$_6$ is an alkyl group, preferably having up to about 15 carbon atoms. As used in the specification and claims, the term "alkyl" means cyclic and acyclic saturated hydrocarbon groups that can be either branched or unbranched. Exemplary soft, non-functional acrylic monomers include, but are not limited to, butyl acrylate, isobutyl acrylate, ethylhexyl acrylate, isodecyl methacrylate, lauryl methacrylate, tridecylmethacrylate. 2-ethylhexyl acrylate is the preferred soft, non-functional monomer.

With respect to the hard monomer, hard monomers include, but are not limited to, alkylene aromatic monomers and non-functional methacrylic monomers. As used in the specification and claims, "alkenyl aromatic monomers" are defined as any organic compound containing at least one aromatic ring and at least one aliphatic-containing moiety having alkenyl unsaturation; and the term "hard monomer" means a monomer whose homopolymer has a T$_g$ of greater than about 30° C. Preferred alkenyl aromatic monomers are represented by the formula IV

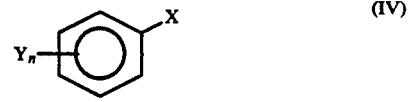

wherein X is an aliphatic radical containing at least one alkenyl bond, Y is a substituent on the aromatic ring, and n is the number of Y substituents on the ring, n being an integer from 0 to 5. Generally, X comprises at least 2 carbon atoms, but usually no more than about 6, and preferably no more than about 3 carbon atoms. X is preferably a substituted or unsubstituted alkenyl group. Preferred substituents on the alkenyl group are halogen radicals, e.g., chloride. However, the most preferred alkenyl group is unsubstituted, i.e., a hydrocarbon, and contains only one olefinic unsaturation. Ethylene is the most preferred X.

Y is an organic or inorganic radical. As used throughout the specification and claims, the term "organic radical" means any group containing at least one carbon atom, and the term "inorganic radical" means any group devoid of carbon atoms. When n is 2 or more, Y can be the same or different. If organic, Y generally contains from 1 to about 15 carbon atoms and, preferably, is an aliphatic radical. Even more preferably, Y is a saturated aliphatic radical. If inorganic, Y is preferably a halogen. Exemplary Y substituents include halo and cyano radicals and substituted and unsubstituted alkyl radicals of 1 to about 10 carbon atoms. Preferred Y substituents are chloride and unsubstituted alkyl groups of 1 to about 6 carbon atoms. Y is more preferably a chloride radical and C$_1$ to about C$_4$ unsubstituted alkyl radicals.

Illustrative alkenyl aromatic monomers include styrene, p-methyl styrene, methyl styrene, o,p-dimethyl styrene, o,p-diethyl styrene, p-chlorostyrene, isopropyl styrene, t-butyl styrene, o-methyl-p-isopropyl styrene, o,p-dichlorostyrene, and mixture thereof. Due to its commercial availability and low cost, styrene is the preferred alkenyl aromatic monomers.

With respect to non-functional methacrylic monomers, exemplary non-functional methacrylic monomers have the formula V

wherein R$_7$ is an alkyl group that preferably contains up to about 6 carbon atoms. Typical non-functional methacrylic monomers include methyl methacrylate, ethyl methacrylate, isobutyl methacrylate, isobornyl methacrylate, and mixtures thereof.

In the various embodiments of the present invention, the polymer preferably has an average particle size (i.e., a maximum cross-sectional diameter) of less than about 250 nm. In general, for the polymer of the invention, the smaller the average particle size, the more water-resistant the polymer. Accordingly, it is preferred that the average particle size of the polymer be from about 85 to about 200 nm, more preferably from about 90 to about 190 nm, and most preferably from about 100 to about 150 nm.

The polymeric emulsion optionally comprises one or more other ingredients. For example, the polymer can comprise a wax. When employed, the wax is generally used in an amount sufficient to increase the water-resistance of resulting film.

In addition, the polymer optionally comprises a chain transfer agent. The chain transfer agent, when used, is typically incorporated to control the molecular weight of the polymer, and is usually employed in a concentration of about 0.01 to about 0.5 weight percent based upon the amount of monomers used in making the polymer. The presence of chain transfer agents is particularly advantageous in PSAs where some low molecular weight polymeric components tend to be desirable.

One or more ureido-containing monomers are also optionally present in the polymer. Exemplary ureido-containing monomers include, but are not limited to, 2-ureido-ethyl acrylate, 2-ureido-methyl acrylate, 2-ureido-ethyl acrylamide, 2-ureido-ethyl methacrylamide, and 1-[2-(3-alloxy-2-hydroxypropylamino)ethyl]imidazolidin-2-one. The preferred ureido-containing monomer is 1-[2-(3-alloxy-2-hydroxypropylamino)ethyl]imidazolidin-2-one, commercially known as Sipomer WAM brand monomer and available from Alcolac. The ureido-containing monomers are generally used in a concentration sufficient to enhance the wet adhesion strength of the emulsion, e.g., from about 0.25 to about 1 weight percent of the polymer.

A surfactant-containing seed is another optional ingredient present in the polymer. The seed generally has an average particle size of less than about 80 nm, and preferably within the range of about 25 to about 60 nm. Exemplary seeds are comprised of alkenyl aromatic monomers, acrylate monomers, and mixtures thereof. Usually, styrene and/or butyl acrylate monomers are employed in manufacturing the seed.

The emulsions of the present invention are made, for example, by a delayed addition polymerization process. Typically, the delay-addition polymerization process comprises forming a monomer mixture containing about 25 to about 90 weight percent soft monomer and about 10 to about 75 weight percent hard monomer, about 1 to about 5 weight percent olefinic carboxylic acid monomer, and about 0.5 to about 5 weight percent cross-linking monomer. Water is added to a reactor and heated, generally to about 150° to about 190° F., while preferably purging the reactor with an inert gas, such as nitrogen, to remove substantially all oxygen from the reactor. A catalyst is then added to the reactor. Preferably, a locus for polymerization (e.g., a surfactant and/or a surfactant-containing seed) is added to the reactor before, simultaneously with, or after the catalyst addition to form a reactor charge. After the addition of the catalyst and locus for polymerization, the delay-addition of the monomer mixture is then commenced. The ensuing reaction forms the emulsion of the present invention. The addition of the monomer mixture typically takes up to about 3 hours. During the delay-addition of the monomer mixture, additional catalyst is typically also added to the reactor. In an alternative synthesis procedure, a portion, for example up to about ½ of the monomer mixture, is added to the reactor at the beginning of the reaction along with the addition of the initial catalyst and/or seed and/or surfactant.

In order to stabilize the emulsion, toward the end the monomer mixture addition, the pH of the emulsion is typically adjusted. Generally, the pH of the emulsion is adjusted to at least about 6, preferably to about 6 to about 10, and most preferably to about 6 to about 8. Adjusting the pH to within these ranges substantially neutralizes all olefinic carboxylic acid groups on the polymer.

Usually the pH of the emulsion is adjusted from about 30 minutes before to about 30 minutes after terminating the addition of the monomer mixture. Preferably, the pH adjustment occurs within about 15 minutes after terminating the monomer mixture addition.

After finishing the monomer mixture addition, further catalyst is commonly added while maintaining the emulsion at the elevated reaction temperature to ensure that substantially all of the monomers polymerize. The same catalyst can be used whenever one is employed. Exemplary catalysts include, but are not limited to, t-butyl hydroperoxide, sodium persulfate, hydrogen peroxide, and mixtures thereof.

The emulsion is allowed to cool to ambient or room temperature after all the monomer mixture and catalyst have been added. Usually, the pH of the cooled emulsion is adjusted, if necessary, to about 8 to about 10. Typically, a base is employed in each instance where the pH of the emulsion is adjusted. Exemplary bases are selected from the group consisting of amine-containing bases, hydroxide-containing bases, and mixtures thereof. Dimethylamine, diethylamine, aminopropanol, ammonium hydroxide, and sodium hydroxide are typical bases, with volatile bases being preferred, and ammonium hydroxide being the most preferred.

The polymerization process yields the polymeric emulsion of the present invention. The solids content of the emulsion is generally at least about 40 weight percent, preferably within the range of about 45 to about 60 weight percent, and more preferably within the range of about 45 to about 55 weight percent.

In use, the emulsion is applied to at least a portion of a surface of a substrate. Upon drying, the emulsion forms a water-resistant film. Accordingly, the emulsion of the instant invention is capable of enhancing the water-resistance of a substrate (e.g., particle board and plywood) and/or maintaining the desirable characteristics of a composition when exposed to moisture (e.g., PSAs).

EXAMPLES

The following examples demonstrate the preparation of exemplary polymeric emulsions within the scope of the present invention as well as the reduction in swelling exhibited by particle board coated with the emulsion after the emulsion-coated particle board is submerged in water. However, the invention is not limited to the examples, but is defined by the claims.

EXAMPLES 1-3

Preparation of Polymeric Emulsions

Monomer mixtures having the compositions set forth in the following Table I were prepared:

TABLE I

| Example | Monomer, g | | | | |
|---|---|---|---|---|---|
| | ST[a] | 2EHA[b] | MAA[c] | IBMA[d] | AAEM[e] |
| 1 | 270 | 318 | 6 | — | 24 |
| 2 | 235 | 323 | 6 | 30 | 12 |
| 3 | 270 | 318 | 6 | — | 12 |

[a]ST denotes styrene.
[b]2EHA denotes 2-ethylhexyl acrylate.
[c]MAA denotes methacrylic acid.
[d]IBMA denotes isobornyl methacrylate.
[e]AAEM denotes acetoacetoxyethyl methacrylate.

In each of Examples 1–3, water (about 550 g) was added to a reactor and heated while purging the reactor with nitrogen. When the water reached a temperature of either about 180° F. (Examples 1–2) or about 160° F. (Example 3), the ingredients listed in Table II, infra, were individually added to the reactor.

TABLE II

| Example | Ingredients g | | |
|---|---|---|---|
| | Sodium Persulfate | 50S[f] | 30S[g] |
| 1 | 0.9 | 36 | — |
| 2 | 0.9 | 36 | — |
| 3 | 0.9 | — | 18 |

[f]50S denotes a 30 weight percent total solids emulsion containing a styrene seed having an average particle size of about 50 nm.
[g]30S denotes a 30 weight percent total solids emulsion containing a styrene seed having an average particle size of about 30 nm.

Next, the monomer mixture shown in the above Table I and a catalyst solution comprising about 0.9 g sodium persulfate and about 27 g water were separately, but simultaneously, added to the contents of the reactor over a period of about 3 hours while maintaining the temperature within the reactor either at about 185° F. (Examples 1–2) or at about 165° F. (Example 3).

In Examples 1–2, at the end of the 3 hour period and after the emulsion in the reactor cooled to about room temperature, the pH of the emulsion was raised to about 8.5 using a solution of about 10% ammonium hydroxide. In Example 3, immediately after finishing the addition of the catalyst solution and the monomer mixture, a solution containing about 5 ml ammonium hydroxide and about 20 ml water was added to the emulsion. After the emulsion cooled to room temperature, the 10% ammonium hydroxide solution was added in a sufficient amount to raise the pH of the emulsion to about 8.5. The total solid content of the emulsions and the average particle size of the polymers (measured with a Nonsizer N4 brand particle sizer available from Coulter Electronics) are given in Table III, infra.

TABLE III

| Example | Particle Size, nm | Total Solids, wt. % |
|---|---|---|
| 1 | 180 | 50.3 |
| 2 | 186 | 49.0 |
| 3 | 133 | 48.3 |

EXAMPLE 4

Preparation of Polymeric Emulsion

A monomer mixture and a cross-linking solution were prepared. The monomer mixture comprised about 1470 g styrene, about 1470 g 2-ethylhexyl acrylate, and about 90 g methacrylic acid. The cross-linking solution contained about 250 g water and about 125 g N-methylol acrylamide.

Next, water (about 2500 g) was added to a reactor and heated while purging the reactor with nitrogen. When the water reached a temperature of about 160° F., about 4.5 g sodium persulfate and about 90 g of a 30 weight percent total solids emulsion containing a styrene seed having an average particle size of about 30 nm were individually added to the reactor.

The monomer mixture and a catalyst solution comprising about 4.5 g sodium persulfate and about 135 g water were then separately added to the contents of the reactor over a period of about 3 hours while maintaining the temperature within the reactor at about 165° F. Immediately after finishing the addition of the catalyst solution and the monomer mixture, a solution containing about 50 ml ammonium hydroxide and about 100 ml water was added to he emulsion. The temperature of the emulsion was afterwards raised to about 175° F. and maintained at that temperature for about 1.5 hours while adding additional catalyst solution to reduce the concentration of any unreacted monomers. The emulsion was then allowed to cool to room temperature.

After the emulsion cooled to room temperature, the 10% ammonium hydroxide solution was added in a sufficient amount to raise the pH of the emulsion to about 8.6. The total solid content of the emulsion was about 47.2 weight percent and the average particle size of the polymer was about 123 nm.

EXAMPLES 5–15

Water-Swelling Test

One end of particle board strips was completely coated with an emulsion of Examples 1–4. After drying the coated strip at about 180° F. for about one hour or at room temperature for about a week, the thickness of the coated end of each strip was first measured and then immersed in water for a period of about 16 hours. The thickness of the coated, immersed end was measured, and the percent increase in thickness (percent swelling) was calculated. The same procedure was followed with a control, i.e., an uncoated particle board strip. The results are set forth in Table IV, infra.

TABLE IV

| Example | Particle Board Coated With Emulsion of | Percent Swelling |
|---|---|---|
| 5 | None (Control) | 32 |
| 6 | Example 1 | 7 |
| 7 | Example 2 | 5 |
| 8 | Example 3 | 3 |
| 9 | Example 4 | 2 |
| 10 | Example 4 | 2 |
| 11 | Example 4 | 5 |
| 12 | Example 4 | 8 |
| 13 | Example 4 | 6 |
| 14 | Example 4 | 5 |
| 15 | Example 4 | 3 |

The data provided in Table IV indicate that particle boards, when coated with emulsions within the scope of the present invention, exhibit a significant reduction in swelling when exposed to water.

Although the present invention has been described in considerable detail with reference to certain preferred versions thereof, other versions are possible. For example, the emulsion can include one or more ingredients that enhance other film and/or emulsion properties. Therefore, the spirit and scope of the appended claims should not necessarily be limited to the description of the preferred embodiments contained herein.

What is claimed is:

1. A polymeric emulsion comprising (i) a polymer, (ii) water, and (iii) a surfactant, wherein the emulsion comprises less than about 1 weight percent surfactant and at least about 40 percent total solids, and the polymer has an average particle size of about 85 to about 200 nm and a $T_g$ of about 0° to about 20° C. and comprises:

(a) a soft monomer whose homopolymer has a $T_g$ of less than about $-20°$ C., the soft monomer being selected from the group consisting of non-functional acrylic monomers, non-functional methacrylic monomers, ethylene, and mixtures thereof;

(b) a hard monomer whose homopolymer has a $t_g$ of greater than about 30° C., the hard monomer being selected from the group consisting of alkenyl aromatic monomers, non-functional methacrylic monomers, and mixtures thereof;

(c) about 1 to about 5 weight percent of an olefinic carboxylic acid monomer; and (d) about 0.5 to about 5 weight percent of a cross-linking monomer selected from the group consisting of N-methylol acrylamide, N-methylol methacrylamide, diacrylates, dimethacrylates, triallyl cyanurate, diallyl maleate, methyl acrylamidoglycolate methyl ether, olefinically unsaturated monomers having the formula

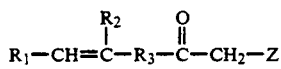

and mixtures thereof, $R_1$ being selected from the group consisting of hydrogen and halogen, $R_2$ being selected from the group consisting of hydrogen, halo, thio, and monovalent organic radicals, $R_3$ being a divalent radical, and Z being selected from the group consisting of organoacyl and cyano, wherein the weight ratio of the hard monomer to the soft monomer in the polymer is about 1:1 to about 1.5:1, the combined weight percent of hard and soft monomers present in the polymer is at least about 90 weight percent, the soft non-functional acrylic and methacrylic monomers have the formula

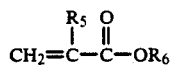

$R_5$ being selected from the group consisting of hydrogen and methyl and $R_6$ being an alkyl group containing up to about 15 carbon atoms, and the hard non-functional methacrylic monomers have the formula

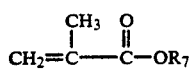

wherein $R_7$ is an alkyl group that preferably contains up to about 6 carbon atoms.

2. The emulsion of claim 1 comprising less than 0.5 weight percent surfactant.

3. The emulsion of claim 1 wherein the olefinic carboxylic acid monomer is selected from the group consisting of mono- and di-olefinic carboxylic acids, and mixtures thereof.

4. The emulsion of claim 1 wherein the emulsion comprises about 2 to about 4 weight percent of the olefinic carboxylic acid monomer.

5. The emulsion of claim 1 wherein the polymer comprises about 1 to about 3 weight percent cross-linking monomer.

6. The emulsion of claim 1 further comprising a chain transfer agent.

7. The emulsion of claim 1 wherein the combined weight percent of hard and soft monomers present in the polymer is at least about 95 weight percent.

8. A polymeric emulsion comprising (i) a polymer, (ii) water, and (iii) a surfactant, the emulsion comprising less than about 1 weight percent surfactant and at least about 40 weight percent total solids, and the polymer having an average particle size of about 85 to about 200 nm and a $T_g$ of about 30° to about 50° C. and comprising:

(a) a soft monomer whose homopolymer has a $T_g$ of less than about $-20°$ C., the soft monomer being selected from the group consisting of non-functional acrylic monomers, non-functional methacrylic monomers, ethylene, and mixtures thereof;

(b) a hard monomer whose homopolymer has a $T_g$ of greater than about 30° C., the hard monomer being selected from the group consisting of alkenyl aromatic monomers, non-functional methacrylic monomers, and mixtures thereof;

(c) about 1 to about 5 weight percent olefinic carboxylic acid monomer; and (d) about 0.5 to about 5 weight percent cross-linking monomer selected from the group consisting of N-methylol acrylamide, N-methylol methacrylamide, diacrylates, dimethacrylates, triallyl cyanurate, diallyl maleate, methyl acrylamidoglycolate methyl ether, olefinically unsaturated monomers having the formula

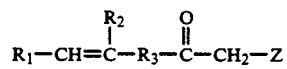

and mixtures thereof, $R_1$ being selected from the group consisting of hydrogen and halogen, $R_2$ being selected from the group consisting of hydrogen, halo, thio, and monovalent organic radicals, $R_3$ being a divalent radical, and Z being selected from the group consisting of organoacyl and cyano, wherein the weight ratio of the hard monomer to the soft monomer in the polymer is about 1.5:1 to about 3:1, the combined weight percent of hard and soft monomers present in the polymer is at least about 90 weight percent, the soft non-functional acrylic and methacrylic monomers have the formula

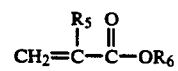

$R_5$ being selected from the group consisting of hydrogen and methyl and $R_6$ being an alkyl group containing up to about 15 carbon atoms, and the hard non-functional methacrylic monomers have the formula

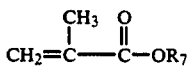

wherein $R_7$ is an alkyl group that preferably contains up to about 6 carbon atoms.

9. The emulsion of claim 8 comprising less than 0.5 weight percent surfactant.

10. The emulsion of claim 8 wherein the polymer comprises about 1 to about 3 weight percent cross-linking monomer.

11. The emulsion of claim 8 further comprising a chain transfer agent.

12. The emulsion of claim 8 wherein the combined weight percent of hard and soft monomers present in the polymer is at least about 95 weight percent.

13. The emulsion of claim 8 wherein the emulsion comprises less than about 0.5 weight percent surfactant; the polymer comprises at least about 95 weight percent hard plus soft monomers, and has (i) a $T_g$ of about 30° to about 50° C., and (ii) an average particle size of about 90 to about 200 nm, and comprises about 2 to about 4 weight percent olefinic carboxylic acid monomer and about 1 to about 3 weight percent cross-linking monomer; the soft monomer is 2-ethylhexyl acrylate; the hard monomer is styrene; the olefinic carboxylic acid monomer is methacrylic acid; and the cross-linking monomer is N-methylol acrylamide.

14. The emulsion of claim 1 wherein the soft non-functional acrylic and methacrylic monomers are selected from the group consisting of butyl acrylate, isobutyl acrylate, ethylhexyl acrylate, isodecyl methacrylate, lauryl methacrylate, and tridecyl methacrylate, and mixtures thereof, and the non-functional methacrylic monomers are selected from the group including methyl methacrylate, ethyl methacrylate, isobutyl methacrylate, isobornyl methacrylate, and mixtures thereof.

15. The emulsion of claim 8 wherein the soft non-functional acrylic and methacrylic monomers are selected from the group consisting of butyl acrylate, isobutyl acrylate, ethylhexyl acrylate, isodecyl methacrylate, lauryl methacrylate, and tridecyl methacrylate, and mixtures thereof, and the non-functional methacrylic monomers are selected from the group including methyl methacrylate, ethyl methacrylate, isobutyl methacrylate, isobornyl methacrylate, and mixtures thereof.

16. The emulsion of claim 1 wherein the hard monomer is styrene and the soft monomer is 2-ethylhexyl acrylate.

17. The emulsion of claim 1 wherein the hard monomer is styrene, the soft monomer is 2-ethylhexyl acrylate, and the carboxylic acid monomer is methacrylic acid.

18. The emulsion of claim 1 wherein the hard monomer is styrene, the soft monomer is 2-ethylhexyl acrylate, the carboxylic acid monomer is methacrylic acid, and the cross-linking monomer is N-methylol acrylamide.

19. The emulsion of claim 1 wherein the polymer has an average particle size of about 90 to about 190 nm.

20. The emulsion of claim 1 wherein the polymer has an average particle size of about 100 to about 150 nm.